US012703295B2

(12) United States Patent
Grabovic

(10) Patent No.: US 12,703,295 B2
(45) Date of Patent: Aug. 11, 2026

(54) ADAPTIVE DRIVING LIGHT SYSTEM

(71) Applicant: BROWN & WATSON INTERNATIONAL PTY LTD, Knoxfield (AU)

(72) Inventor: Joshua Grabovic, Newport (AU)

(73) Assignee: BROWN & WATSON INTERNATIONAL PTY LTD, Knoxfield (AU)

( * ) Notice: Subject to any disclaimer, the term of this patent is extended or adjusted under 35 U.S.C. 154(b) by 0 days.

(21) Appl. No.: 18/692,293

(22) PCT Filed: Sep. 16, 2022

(86) PCT No.: PCT/AU2022/051116
§ 371 (c)(1),
(2) Date: Mar. 14, 2024

(87) PCT Pub. No.: WO2023/039635
PCT Pub. Date: Mar. 23, 2023

(65) Prior Publication Data

US 2024/0383397 A1 Nov. 21, 2024

(30) Foreign Application Priority Data

Sep. 17, 2021 (AU) ................................ 2021902994

(51) Int. Cl.
*B60Q 1/14* (2006.01)
*F21S 45/47* (2018.01)

(52) U.S. Cl.
CPC ............ *B60Q 1/1423* (2013.01); *F21S 45/47* (2018.01)

(58) Field of Classification Search
None
See application file for complete search history.

(56) References Cited

U.S. PATENT DOCUMENTS 11,007,926 B1 * 5/2021 Smart .................. H05B 45/335
2003/0137849 A1 7/2003 Alden
(Continued)

FOREIGN PATENT DOCUMENTS

DE 102013001274 A1 7/2014
EP 1780462 A1 5/2007
(Continued)

OTHER PUBLICATIONS

International Search Report and Written Opinion issued Oct. 28, 2022 for PCT/AU2022/051116, 14 pages.
(Continued)

*Primary Examiner* — Kenneth B Wells
(74) *Attorney, Agent, or Firm* — Kilpatrick Townsend & Stockton LLP

(57) ABSTRACT

A driving light system for a vehicle, including: an array of lighting modules for illuminating a lighting zone in front of a vehicle, each module including: a light emitter unit for emitting a light beam along a light path to illuminate a segment of the lighting zone; and a directional light sensor unit adapted to detect reflected light from reflective surfaces in the path of the light beam, and at least one controller for automatically controlling the brightness of each emitted light beam as a function of light detected by one or more of the directional light sensors.

20 Claims, 19 Drawing Sheets

(56) References Cited

U.S. PATENT DOCUMENTS

| | | | | |
|---|---|---|---|---|
| 2008/0055896 | A1 | 3/2008 | Feldmeier | |
| 2009/0010494 | A1 | 1/2009 | Bechtel et al. | |
| 2013/0169154 | A1 | 7/2013 | Kay et al. | |
| 2015/0266408 | A1 | 9/2015 | Leang | |
| 2017/0305327 | A1 | 10/2017 | Hoffmann et al. | |
| 2018/0058674 | A1 | 3/2018 | Reynolds | |
| 2018/0118091 | A1 | 5/2018 | Wymore et al. | |
| 2019/0126809 | A1 | 5/2019 | Wymore | |
| 2020/0072432 | A1 | 3/2020 | Spencer | |
| 2020/0108766 | A1 * | 4/2020 | Shibata | B60Q 1/143 |
| 2021/0071838 | A1 * | 3/2021 | Haase | F21S 41/65 |
| 2021/0188155 | A1 | 6/2021 | Massa | |
| 2023/0144346 | A1 * | 5/2023 | Almehio | H04N 19/98 315/82 |

FOREIGN PATENT DOCUMENTS

| | | | |
|---|---|---|---|
| EP | 2508392 | A1 | 10/2012 |
| EP | 3792547 | A1 | 3/2021 |
| WO | 2021018657 | A1 | 2/2021 |
| WO | 2021142535 | A1 | 7/2021 |

OTHER PUBLICATIONS

EP 22868469.2 , "Supplementary European Search Report", May 14, 2025, 14 pages.

* cited by examiner

FORMAT 1

INTERGRATED

FORMAT 4

HYBRID

FORMAT 4

HYBRID

FORMAT 4A

HYBRID

540

| | MODES | MAIN (24") | AUX (8") |
|---|---|---|---|
|  | ADAPTIVE ON/OFF | ADAPTIVE/PRESET | ADAPTIVE/PRESET |
|  | DIRT ROAD DEFAULT | 100% | 100% |
|  | HIGHWAY | 100% | 100% |
|  | 4WD TRACK | 50% | 50% |
| 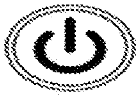 | ON/OFF | 0% | 0% |
| **SENSITIVITY +** | UP | INCREASE THRESHOLD BY 25% MAX | INCREASE THRESHOLD BY 25% MAX |
| **SENSITIVITY -** | DOWN | DECREASE THRESHOLD BY 25% MAX | DECREASE THRESHOLD BY 25% MAX |
| **BRIGHTNESS +** | UP | INCREASE BY 50% MAX | INCREASE BY 50% MAX |
| **BRIGHTNESS -** | DOWN | DECREASE BY 50% MAX | DECREASE BY 50% MAX |

FIGURE 21

ADAPTIVE DRIVING LIGHT SYSTEM

This application is a US National Phase of PCT/AU2022/051116, filed internationally on Sep. 16, 2022, which claims priority to Australian Application No. 2021902994 filed on Sep. 17, 2021, the contents of which are incorporated by reference in their entirety for all purposes.

TECHNICAL FIELD

The present invention relates generally to driving lights for vehicles and in particular to driving light systems for vehicles that include an array of lighting modules for illuminating a lighting zone in front of a vehicle.

BACKGROUND

Driving lights are additional headlights used to supplement a vehicle's existing headlights and are designed to better illuminate a road in front of a vehicle over a long distance, for example, in country areas. Light bars including an array of LEDs or other light emitting devices are one form of additional headlights or driving lights, and may be fitted to the front of vehicles to provide this supplementary illumination.

High powered driving lights can produce such intense light as to cause "flare back" from road signs in the path of light emitted by the driving lights. Many perceive flare back as the single biggest issue facing the widespread adoption of high-powered driving lights.

Typically, a standard low beam of a vehicle is designed to minimise any significant flare back from road signs. However, high-powered driving lights illuminate a large area of the road ahead, with the highest intensity of light being in the middle of the beam. Oncoming road signs are a significant problem as they catch light and reflect back into a driver's eyes. As the road signs become closer, the flare becomes more intense.

It would be desirable to provide a driving light system for a vehicle that minimises the problems and/or inconveniences of flare back from road signs. It would also be desirable to provide a driving light system for a vehicle that ameliorates or overcomes one or more problems of known driving light systems.

SUMMARY

According to a first aspect of the present invention, there is provided a driving light system for a vehicle, including:

- an array of lighting modules for illuminating a lighting zone in front of a vehicle, each module including:
  - a light emitter unit for emitting a light beam along a light path to illuminate a segment of the lighting zone; and
  - a directional light sensor unit adapted to detect reflected light from reflective surfaces in the path of the light beam, and
- a feedback controller for automatically controlling the brightness of each emitted light beam as a function of light detected by one or more of the directional light sensors.

In one or more embodiments, the lighting modules are arranged to illuminate segments extending laterally across the lighting zone.

In one or more embodiments, each light emitter unit includes one or more light sources housed in an emitter housing.

In one or more embodiments, each light emitter unit further includes an optical element to focus light from the one or more light sources through a lens along the light path.

In one or more embodiments, each light emitter unit further includes a heat sink to cause heat flow away from the light emitter unit.

The light source may, for example, be an LED or laser emitter.

In one or more embodiments, each directional light sensor unit includes a light sensor housed in a sensor housing.

Each directional light sensor unit may further include a collimator for focusing the reflected light on the light sensor.

In one or more embodiments, the feedback controller is mounted in each lighting module between the light emitter unit and the directional light sensor unit.

The directional light sensor unit may, for example, be mounted below the light emitter unit, when in use, to avoid heating of the feedback controller and directional light sensor unit by the light emitter unit.

In one or more embodiments, the light housing and sensor housing of each lighting module is integrated.

In one or more embodiments, the driving light system may further include one or more mounting bars for mounting one or more lighting modules from the array to the vehicle.

In one or more embodiments, the light housing and sensor housing of a plurality of lighting modules in the array are integrated.

In one or more embodiments, the driving light system further includes one or more mounting brackets for mounting a plurality of lighting modules to the vehicle.

In one or more embodiments, the feedback controller is configured to automatically control the brightness of the emitted light beam from each lighting module as a function of light detected by the directional light sensor from that same lighting module.

In one or more embodiments, the feedback controller is configured to dim the emitted light beam by a fixed amount if the sensor reading is greater than a predetermined threshold.

In one or more embodiments, the feedback controller is configured to dim the emitted light beam by a fixed amount if the sensor reading increased at greater than a predetermined rate.

In one or more embodiments, the feedback controller is configured to brighten the emitted light beam by a fixed amount if the sensor reading is less than a predetermined threshold.

In one or more embodiments, the feedback controller is configured to automatically control the brightness of the emitted light beam from each lighting module as a function of light detected by the directional light sensor from one or more of the lighting modules in the array of lighting modules.

In one or more embodiments, the feedback controller is configured to dim the emitted light beam from each lighting module by a fixed amount if the sensor reading from that same lighting module is greater by a predetermined threshold than the sensor reading from one or more other lighting modules.

In one or more embodiments, the driving light system further includes a modulator for modulating the light beam emitted by each light emitter unit in a different manner, wherein one or more of the light sensor units are adapted to determine the particular light emitter unit from which the light beam was emitted.

In one or more embodiments, the modulator is configured to apply one of the following modulations to the light beam emitted by each light emitter unit:

applying a different Pulse Width Modulation (PWM) frequency for each light emitter unit;

applying a different PWM phase for each light emitter unit;

periodically insert a burst of unique frequency PWM into the light beam emitted by each light emitter unit;

periodically insert a unique code into each light emitter unit; and periodically insert a uniquely timed burst of an identified pattern into each light emitter unit.

In one or more embodiments, each lighting module includes a separate controller.

In one or more embodiments, the at least one controller includes a central controller to automatically control operations of each of the lighting modules.

In one or more embodiments, the at least one controller further includes a plurality of distributed controllers, each lighting module including a separate one of the plurality of distributed controllers, wherein the central controller and the plurality of distributed controllers respectively function as master and slaves.

In one or more embodiments, the driving light system further includes a broadcast serial network facilitating communication between the central controller and the plurality of distributed controllers.

In one or more embodiments, the central controller and the plurality of distributed controllers communicate via a LIN bus serial communications protocol.

In one or more embodiments, the at least one controller is configured to adjust the predetermined threshold in response to a first manual user input.

In one or more embodiments, the at least one controller is configured to adjust the brightness of the emitted light beam from one or more of the lighting modules from one or more preset brightness levels in response to a second manual user input.

In one or more embodiments, the at least one controller is configured to engage or disengage automatic light beam brightness control in response to a third manual user input.

BRIEF DESCRIPTION OF DRAWINGS

The invention will now be described in further detail by reference to the accompanying drawings. It is to be understood that the particularity of the drawings does not supersede the generality of the preceding description of the invention.

FIG. 21 is a table depicting manually selectable operational states of the driving light system shown in FIG. 19.

DETAILED DESCRIPTION

Figure 1:
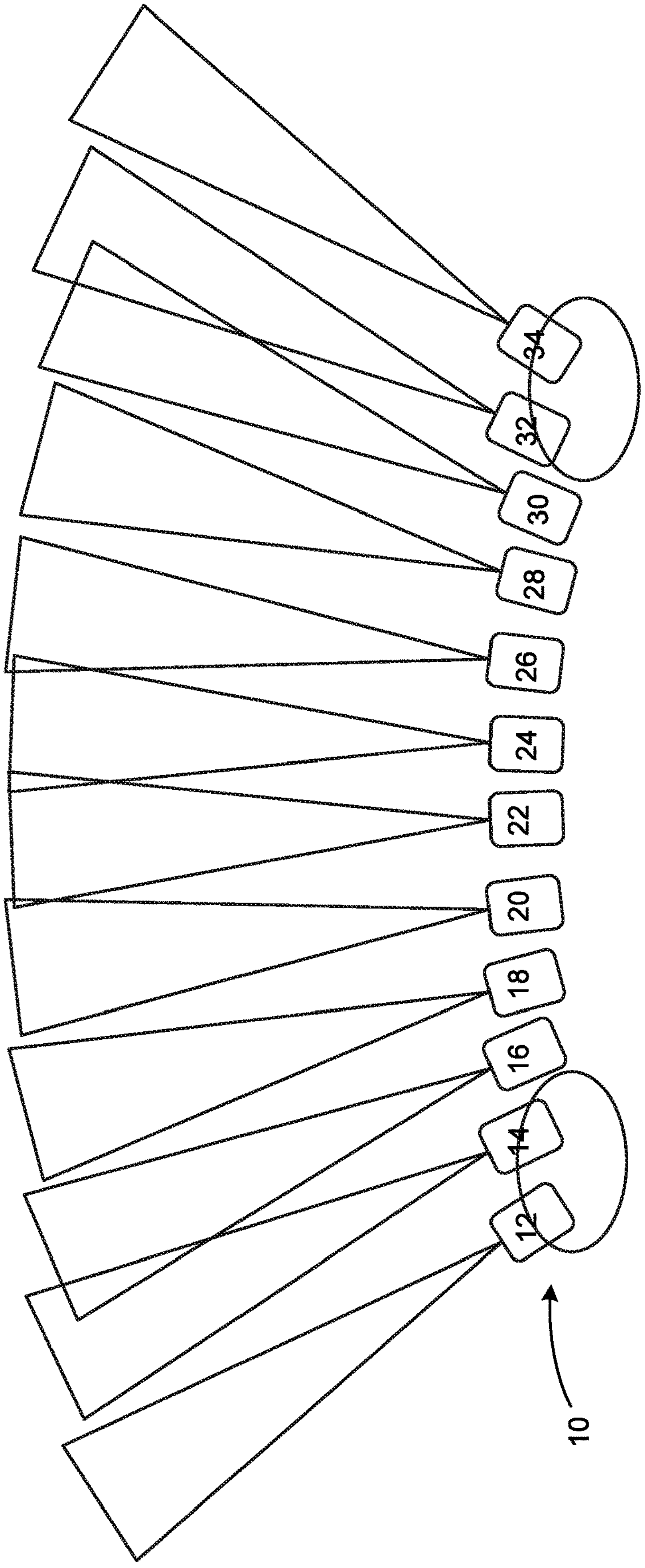
FIG. 1 is a schematic diagram of an array of lighting modules forming part of a first embodiment of a driving light system for a vehicle according to the present invention.

Referring firstly to FIG. 1, there is shown an illustrative array 10 of lighting modules, forming part of a driving light system for a vehicle, for illuminating a lighting zone in front of the vehicle. The array 10 of lighting modules includes light modules 12 to 34.

Figure 2:
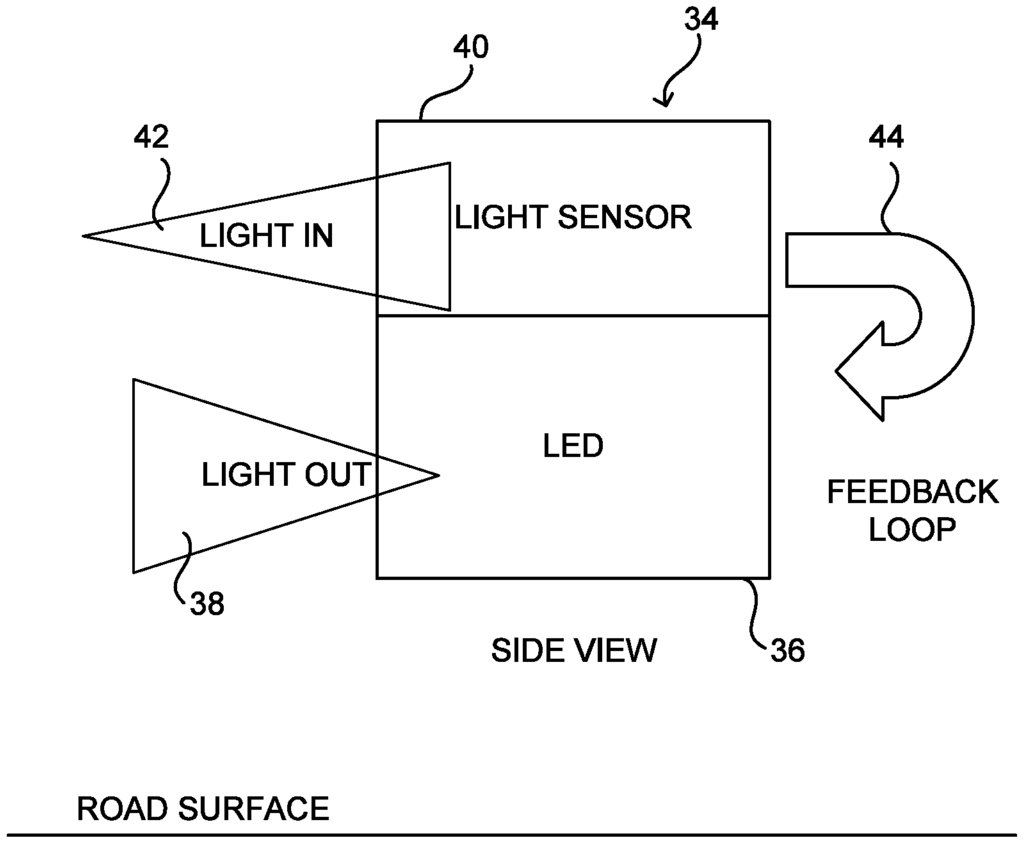
FIG. 2 is a schematic diagram depicting a light emitting unit and a directional light sensor unit forming part of each lighting module depicted in FIG. 1.

FIG. 2 depicts in a schematic manner the principal elements and functioning of a lighting module 34. The lighting module 34 includes a light emitter unit 36 for emitting a light beam 38 and a light sensor unit 40 adapted to detect reflected light 42 from reflective surfaces in the part of the light beam emitted by the light emitter unit. A feedback controller (not depicted in FIG. 2) provides a feedback loop 44 for automatically controlling the brightness of each emitted light beam as a function of light detected by the directional light sensor unit 40 (or in other embodiments of the invention for a combination of one or a plurality of directional light sensor units in the array of lighting modules).

Figure 3:
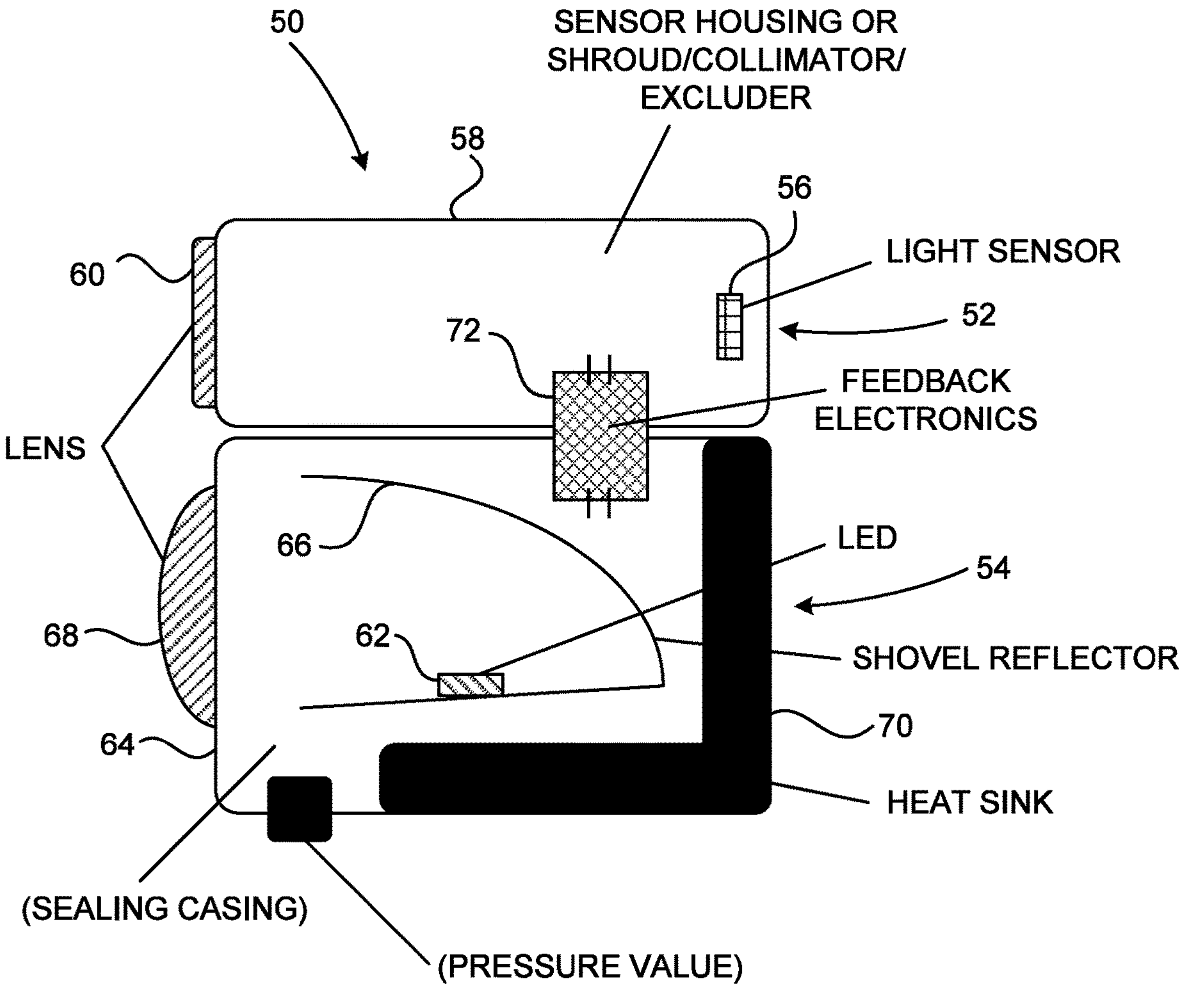
FIG. 3 is a more detailed schematic diagram of the light emitting unit and directional light sensor unit shown in FIG. 2.

Further details of an exemplary lighting module 50 are shown in FIG. 3. The lighting module 50 includes a light sensor unit 52 and a light emitter unit 54. The light sensor unit 52 includes a light sensor 56 housed in a sensor housing 58. The light sensor unit 52 further includes a collimator 60, such as a collimating lens, for focusing reflected light perceived by the light sensor unit onto the light sensor 56. In other embodiments, the collimator 60 can use a collimator tube without a lens.

The light emitter unit 54 includes one or more light sources 62, such as a high-powered LED, housed in an emitter housing 64. The light emitter unit further includes an optical element 66 to focus light from the one or more light sources 62 through a lens 68 along a light path. The optical element 66 may in certain embodiments be formed by a reflector configured to reflect or refract light, such as a shovel reflector. The light emitter unit 54 further includes a heat sink 70 to cause heat to flow away from the light emitter unit 54.

The lighting module 50 further includes feedback electronics 72 to provide the feedback loop 44 shown in FIG. 2 to enable automatic control of the brightness of each emitted light beam as a function of light detected by one or more of the directional light sensors in the lighting modules forming part of the array of lighting modules in the driving light system. The feedback electronics 72 may form a feedback controller and be configured to automatically control the brightness of the emitted light beam from each lighting module as a function of light detected by the directional light sensor from that same lighting module. In the example depicted in FIG. 3, the feedback electronic 72 may therefore form part of an independent lighting module where light detected from the light sensor 56 is used by the feedback electronics 72 to control the brightness of light emitted by the one or more light sources 62.

The feedback electronics may be configured to control the brightness of the emitted light beam in a number of ways. For example, in some embodiments the feedback electronics 72 may be configured to dim the emitted light beam by a fixed amount if the light sensor reading is greater than a predetermined threshold. The value of the threshold depends on factors including the nature of the emitter, the beam shape and intensity, amount of overlap, the sensitivity of the chosen sensor and the like. This threshold value can be determined by experimentation.

In other embodiments, the feedback electronics 72 may be configured to dim the emitted light beam by a fixed amount if the sensor reading is increased at greater than a predetermined rate. In yet other embodiments, the feedback electronic 72 may be configured to brighten the emitted light beam by a fixed amount if the sensor reading is less than a predetermined threshold. Once again, the fixed amount by which the beam is to be brightened or dimmed, and the predetermined rate or threshold, can be determined experimentally.

Figure 4:
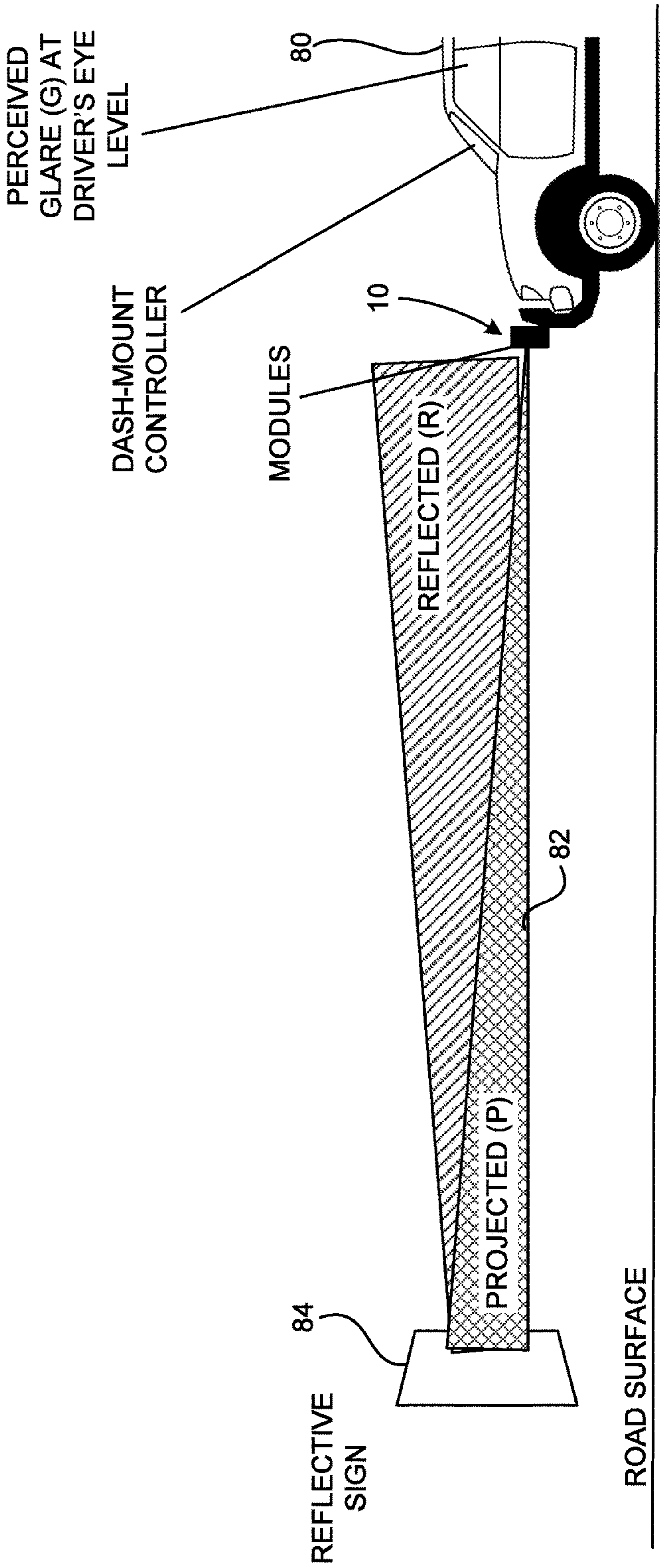
FIG. 4 is a schematic diagram depicting a driving light system in accordance with one or more embodiments of the invention when mounted to a vehicle, and both emitting a light beam and detecting reflected light from a reflective sign in the path of the emitted light beam.

FIG. 4 depicts the manner in which the lighting array 10 shown in FIG. 1 is typically mounted to a vehicle 80 so that light emitted from the light emitter units of each of the modules in the array of light emitting modules emits a light beam 82 along a light path to illuminate a segment of a lighting zone in front of the vehicle, and how light reflected from reflective surfaces, such as a reflective sign 84 in the path of the light beam is detected by the directional light sensor units in the array of lighting modules.

Figure 5:
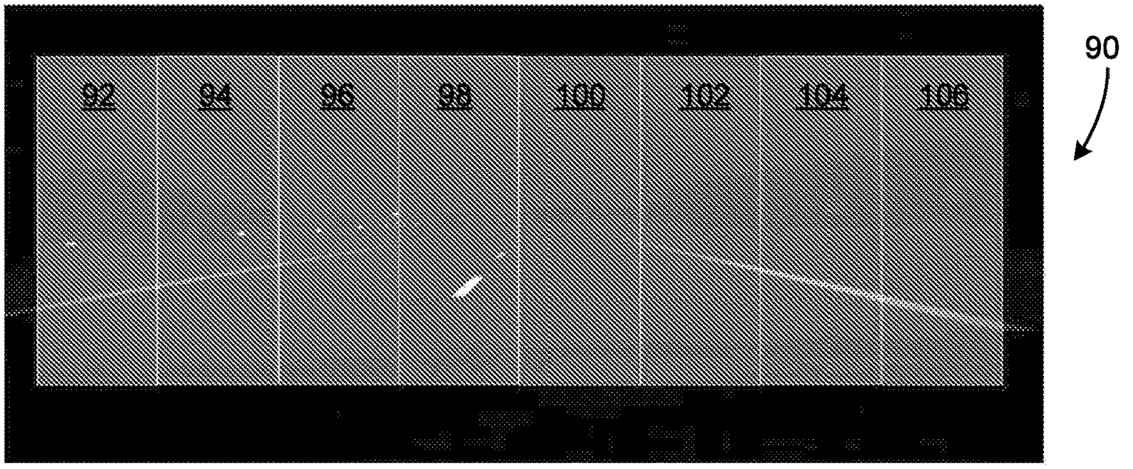
FIGS. 5, 6 and 7 are schematic diagrams depicting a lighting zone in front of the vehicle depicted in FIG. 4, and the segmentation of that lighting zone into individual segments illuminated by the lighting modules in an array of lighting modules forming part of one or more embodiments of the driving light system, and in sequence, results obtained by controlling the brightness of light emitter units to automatically control the brightness of each emitted beam as a function of light detected by one or more of the directional light sensors as a vehicle travels towards a reflective sign in the path of the emitted light beams.
Figure 6:
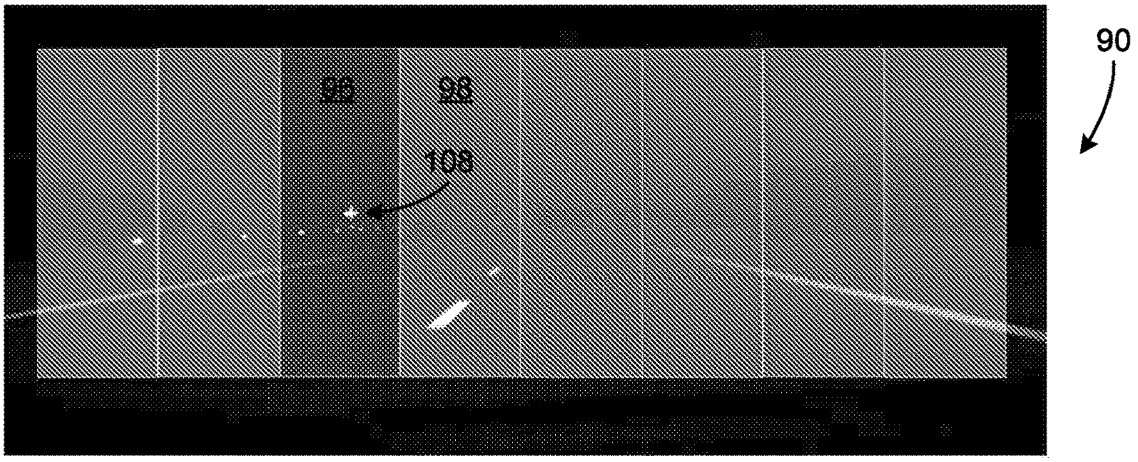
Figure 7:
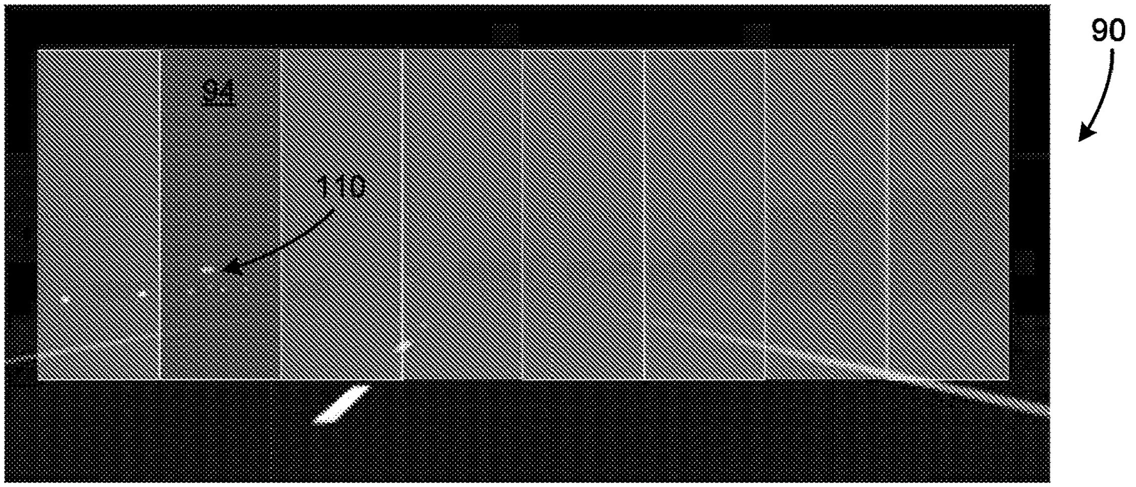

FIGS. 5 to 7 depict an exemplary lighting zone 90 illuminated by the array 10 of light modules forming part of the driving light system for the vehicle 80. The lighting modules 12 to 34 in the array 10 are arranged to illuminate segments 92 to 106 extending laterally across the lighting zone 90. The lighting modules in each array of lighting modules forming part of the driving light system are arranged to separately illuminate the segments 92 to 106 of the lighting zone 90.

As shown in FIG. 5, in the normal operation, that is in the absence of detecting reflected light from a reflective surface within any of the light zone segments 92 to 106 causing feedback electronics 72 to make any correction of the brightness of each emitted light beam, there is relatively uniform illumination of the lighting zone across all signals 92 to 106. Although the light zone segments 92 to 106 are shown in FIG. 5 as non-overlapping, in other embodiments one or more of the light zone segments may be partially overlapping.

However, as shown in FIG. 6, when a road sign or other reflective surface in the part of one of the emitted light beams is of sufficient intensity to cause "flare back" 108 in segment 96, the feedback electronics 72 is configured to control the brightness of the emitted light beam from the light emitter unit in that module until an "acceptable flare" is reached. This is depicted in FIG. 6 by the light zone segment being represented in a darker shade corresponding to a lower level of illumination.

As the vehicle progresses down a path or road, the position of the road sign causing the "flare back" can be displaced to another lighting zone segment, such as the section 94 shown in FIG. 7. As the "flare back" 118 shown in FIG. 6 moves to become "flare back" 110 in lighting zone segment 94 as shown in FIG. 7, the feedback electronics forming part of the lighting module responsible for illumination of zone 98 returns the brightness of the emitted light beam to a standard brightness, whereas detection of the "flare back" 110 in segment 94 causes the feedback electronics associated with the lighting module responsible for illuminating zone 94 to automatically control the brightness of the emitted light beam from the light emitting unit of that module and so as to reduce the intensity of that segment until an acceptable "flare" is reached.

Figure 8:
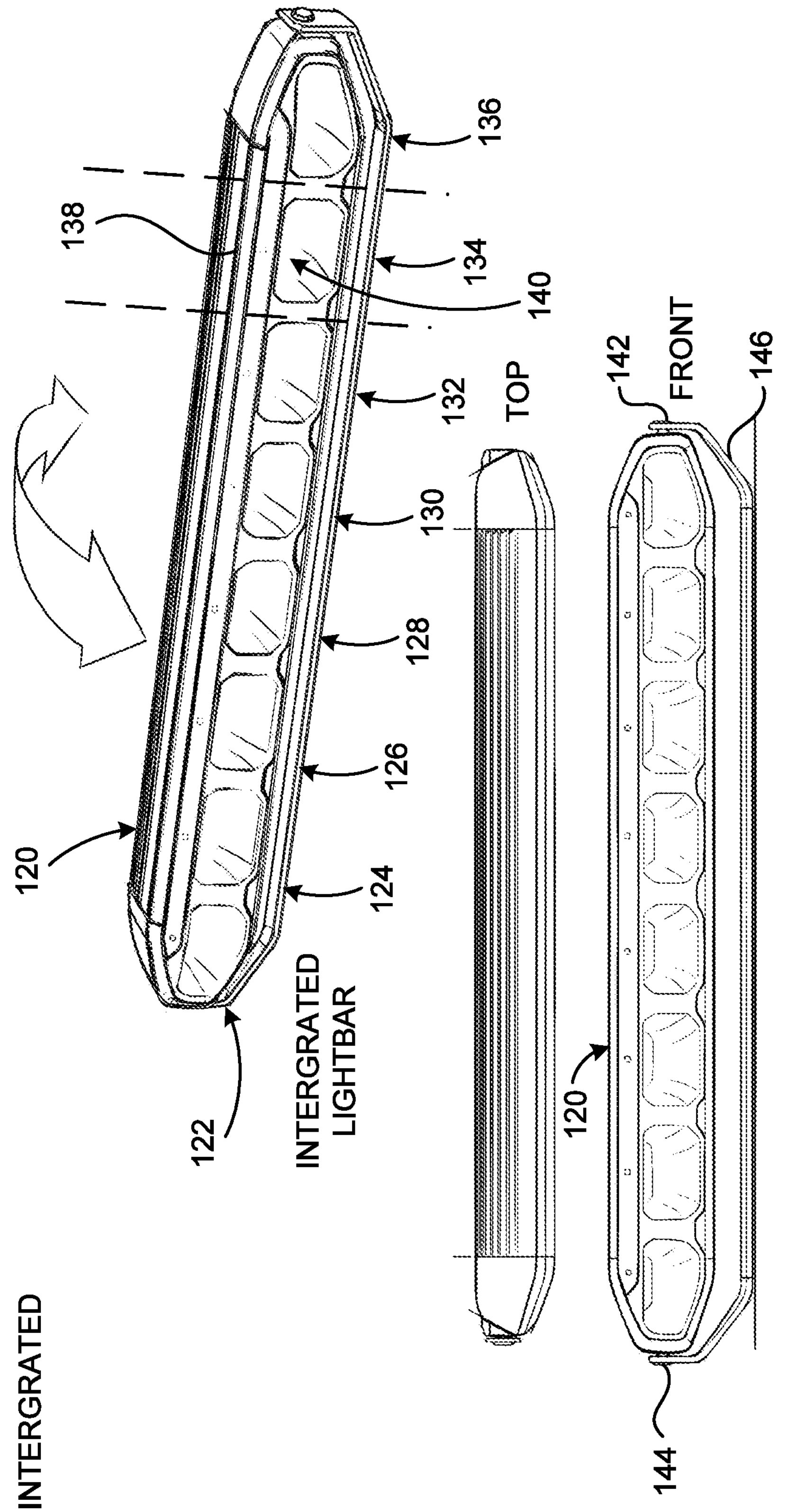
FIGS. 8 and 9 depict one or more embodiments of a driving light system for a vehicle according to the present invention in which the light emitter unit housing and a light sensor housing from one or more lighting modules in the array are integrated.

As shown in FIG. 8, the emitter housing and sensor housing of one or more of the lighting modules in the array of the lighting modules forming part of the driving light system may be integrated. Such an integrated array 120 is shown in FIG. 8. The integrated array 120 includes lighting modules 122 to 136 with each module, such as lighting module 134 including a directional light sensor unit 138 mounted in this embodiment above a light emitter unit 140. The integrated array 120 is shown to be pivotally mounted at pivot points 142 and 144 to a mounting bar 146.

Figure 9:
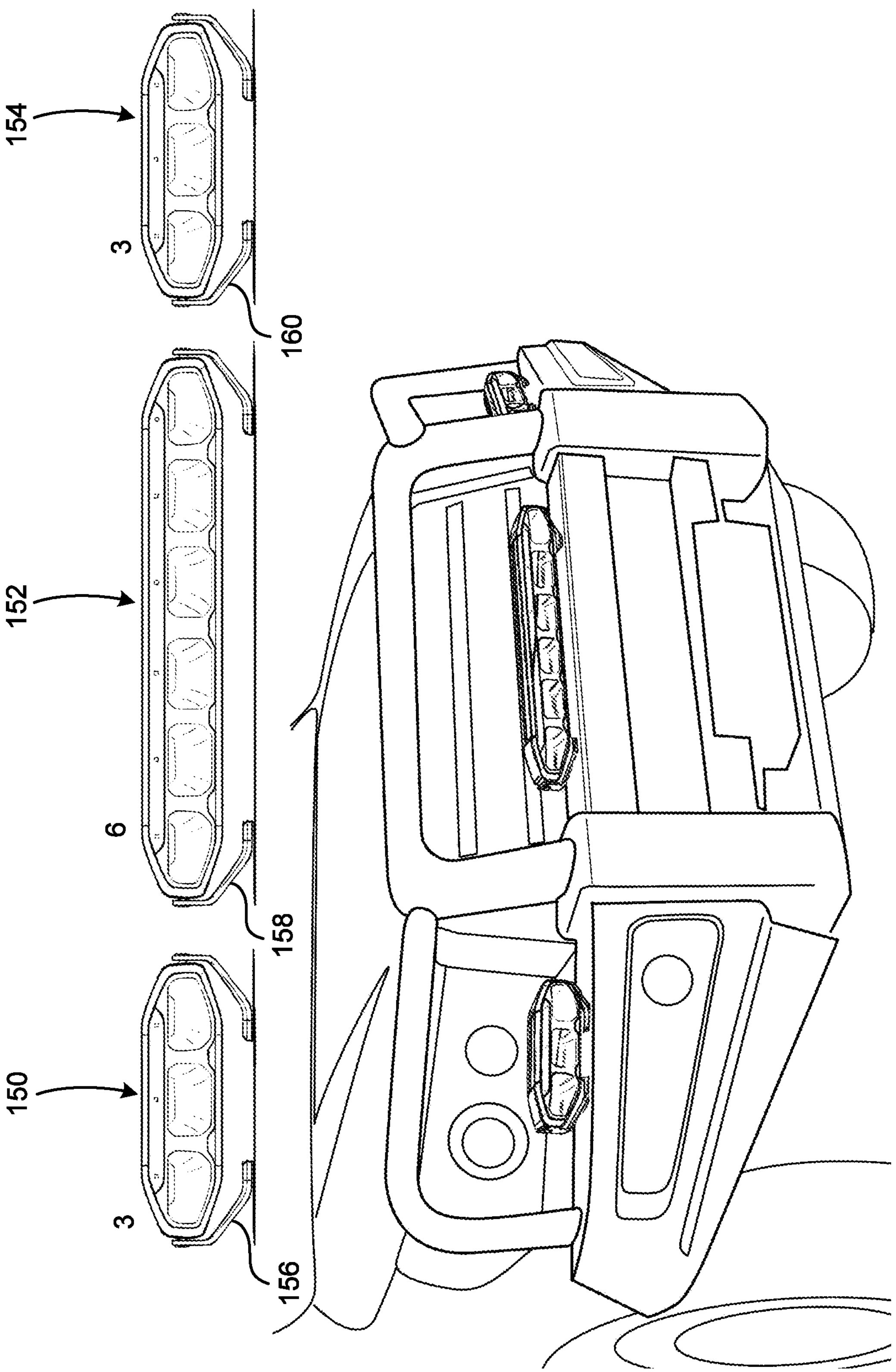

Rather than integrating the housings of all of light modules in an array into a single "light bar", groups of one or more lighting modules may be arranged so that their housings are integrated. As seen in FIG. 9, exemplary groupings of three, six and three lighting modules are shown respectively in integrated lighting module arrays 150, 152 and 154. In this example, the array of lighting modules are grouped into 3 separate integrated arrangements. Each of the integrated lighting bars may be pivotally mounted to a vehicle by means of mounting bars 156 to 160.

Figure 10:
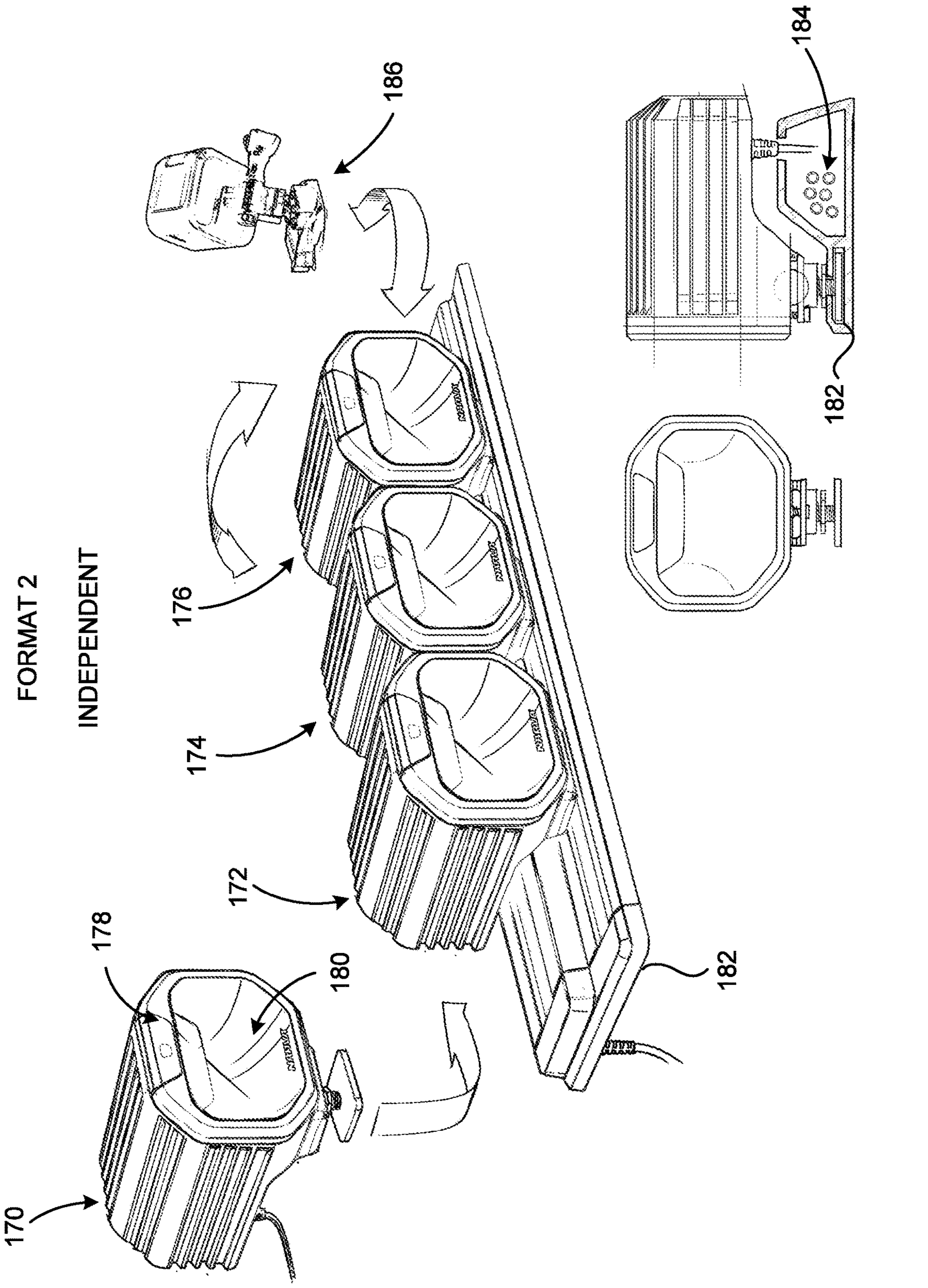
FIGS. 10 to 12 depict a further embodiment of a driving light system according to the present invention including independent lighting modules adapted to be mounted to one or a series of mounting bars.

Instead of the housings of all or groups of the lighting module arrays being integrated, FIG. 10 depicts an alternative arrangement in which each of the lighting module arrays are independent from each other. Independently housed lighting modules 170 to 176, each including a directional light sensor unit, such as that referenced 178 in lighting module 170, and light emitter unit, such as that referenced 180 in lighting module 170, are attachable to a powered mounting rail 182. The lighting modules 170 to 176 as shown in FIG. 10, are independent, and may be individually cast and sealed. The mounting bar 182 may be extruded and include a cable channel 184 for locating electrical cables to and from each module. Any suitable mounting of the modules to the mounting bar may be used, however, one convenient mounting device is a universal ball mount 186 to enable free adjustment of each lighting module so as to properly orient a desired light path.

Figure 12:
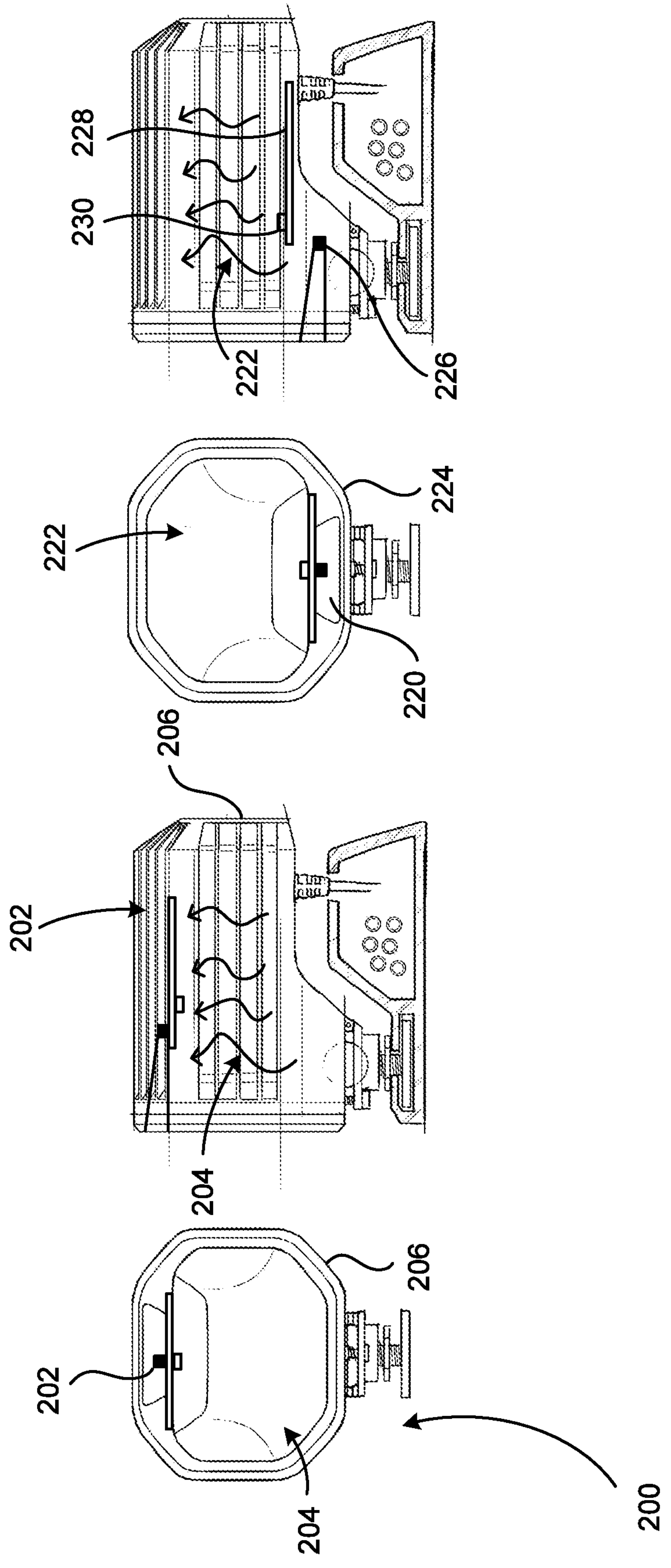

FIG. 12 shows the relative locations of the light emitter unit, directional light centre and feedback controller within two embodiments of the independent lighting module arrangement depicted in FIG. 10. A first lighting module 200, a directional light sensor unit 202 is mounted, when in use, above a light emitter unit 204 within a module housing 206. Such an arrangement may well be suitable in many applications, however in an alternative arrangement a directional light sensor unit 220 may be mounted below a light emitter unit 222 in a lighting module housing 224 in order to keep the light sensor 226 and PCB 228 on which feedback electronic 230 are mounted cool.

Figure 11:
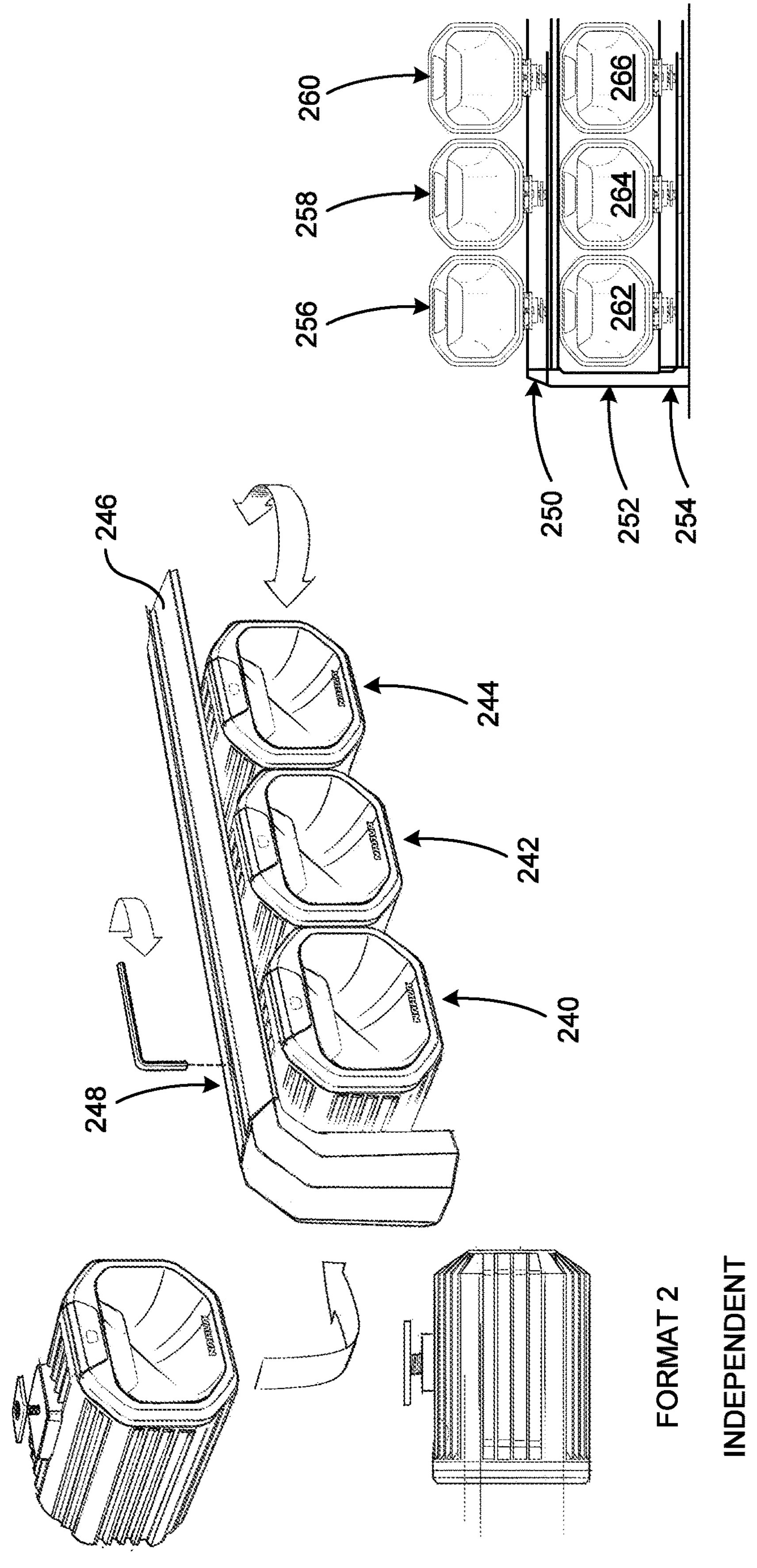

Whilst the arrangement shown in FIG. 10 depicts independent lighting modules mounted to a single linear mounting bar 182 so as to be located above that mounting bar, an alternative arrangement is shown in FIG. 11. In this arrangement, lighting modules 240 to 244 may be attached to a mounting bar 246 so as to be located beneath that mounting bar. Such an arrangement may facilitate easy access to an adjustment mechanism 248 located on top of the mounting bar 246.

Furthermore, FIG. 11 shows a further embodiment in which mounting bars 250 and 252 may be stacked on each other, and supported from each other by a brace 254, to enable two rows of independent lighting modules 256 to 266 to be located on a vehicle.

Figure 13:
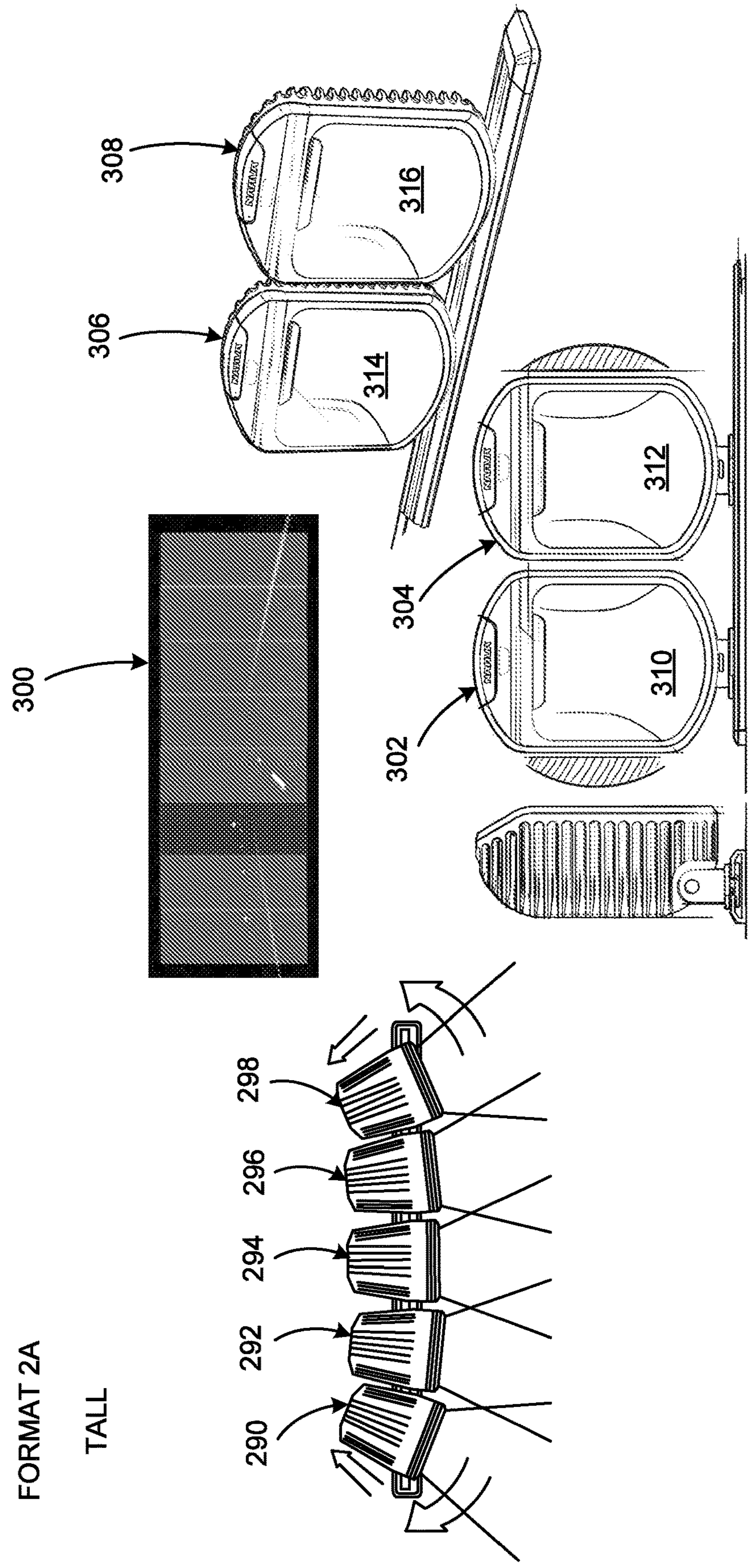
FIG. 13 depicts a further embodiment of a driving light system according to the present invention including vertically elongated lighting modules.

In a further embodiment shown in FIG. 13, independent lighting modules 290 to 298 having a tall format and standard may be provided to enable a more vertical distribution of light in the lighting zone 300. In the lighting modules 302 to 308 illustrative of this principle, larger reflectors 310 to 316 may be used, as well as a larger heat sink. In illustrative embodiments, the "tall" lighting modules shown in FIG. 13 have dimensions of 50 mm×50 mm×60 mm, and it is envisaged that most viable sizes would have forward facing dimensions of less than 100 mm×100 mm.

Figure 14:
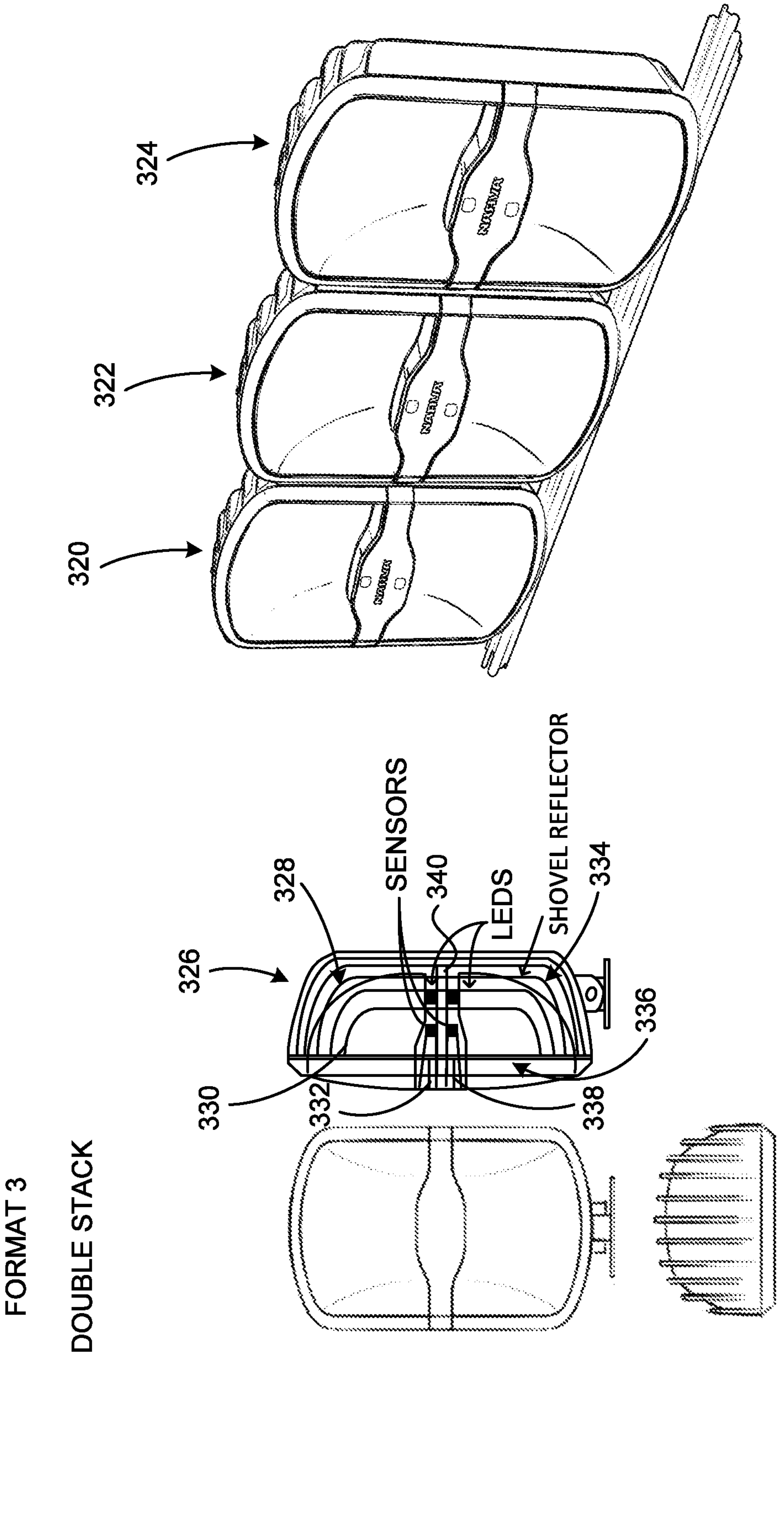
FIG. 14 depicts a further embodiment of a driving light system according to the present invention in which two lighting modules are vertically stacked and housed within a single housing.

A further embodiment of lighting modules mounted to a mounting bar is depicted in FIG. 14. In this embodiment, the emitter housing and sensor housing of more than one lighting module part are integrated into separate multi-module housings 32 to 34. In such "double stack" housings, such as the exemplary housing 326 shown in cutaway view, a first lighting module 328 including a light emitter unit 330 and light sensor unit 332 is mounted in the housing 326 directly above a second module 334 including a light emitter unit 336 and light sensor unit 338, with the sensors and other electronics being mounted on a PCB 340 located within the housing 326 between the modules 328 and 334.

Figure 15:
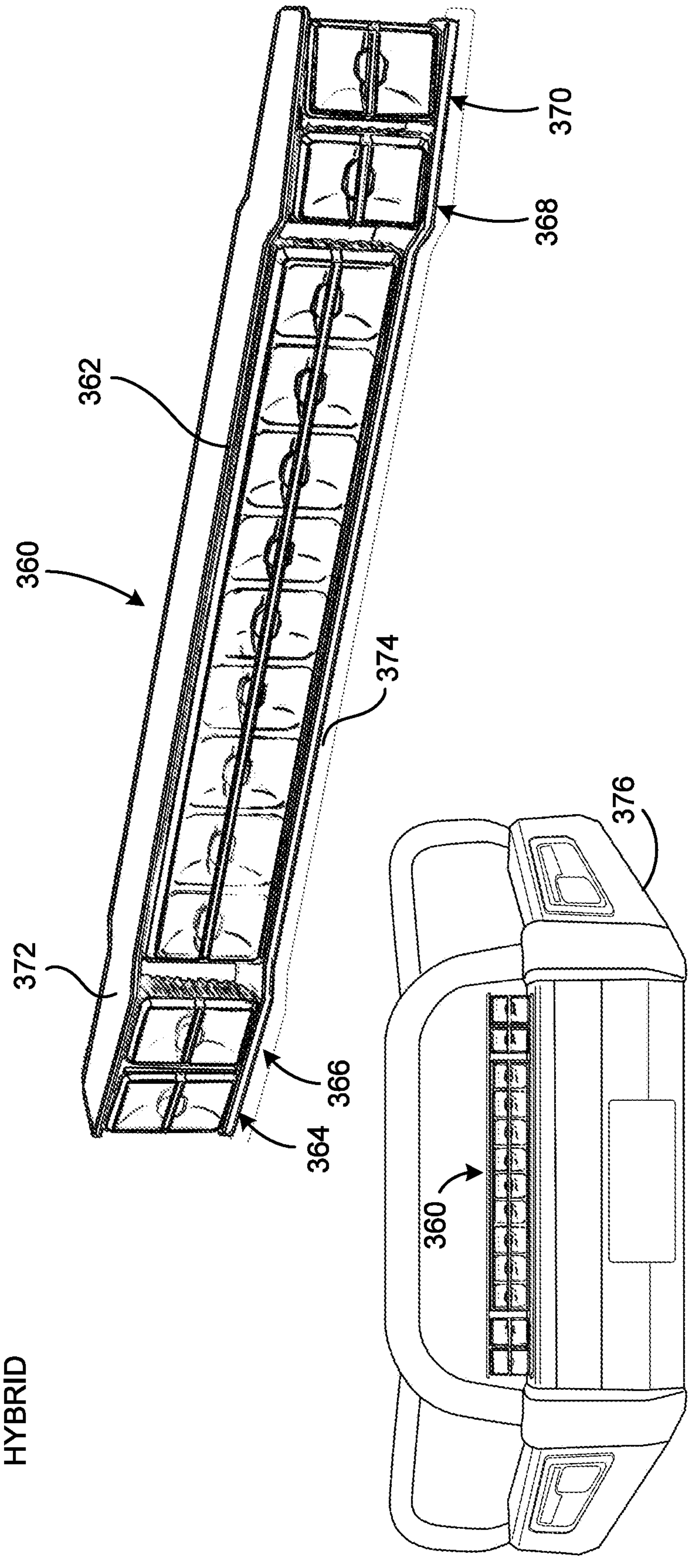
FIGS. 15 and 16 depict a further embodiment of a driving light system according to the present invention including both a plurality of lighting modules having light housings and sensor housings of all modules integrated as well as one or more independent lighting modules mounted to a common mounting arrangement.
Figure 16:
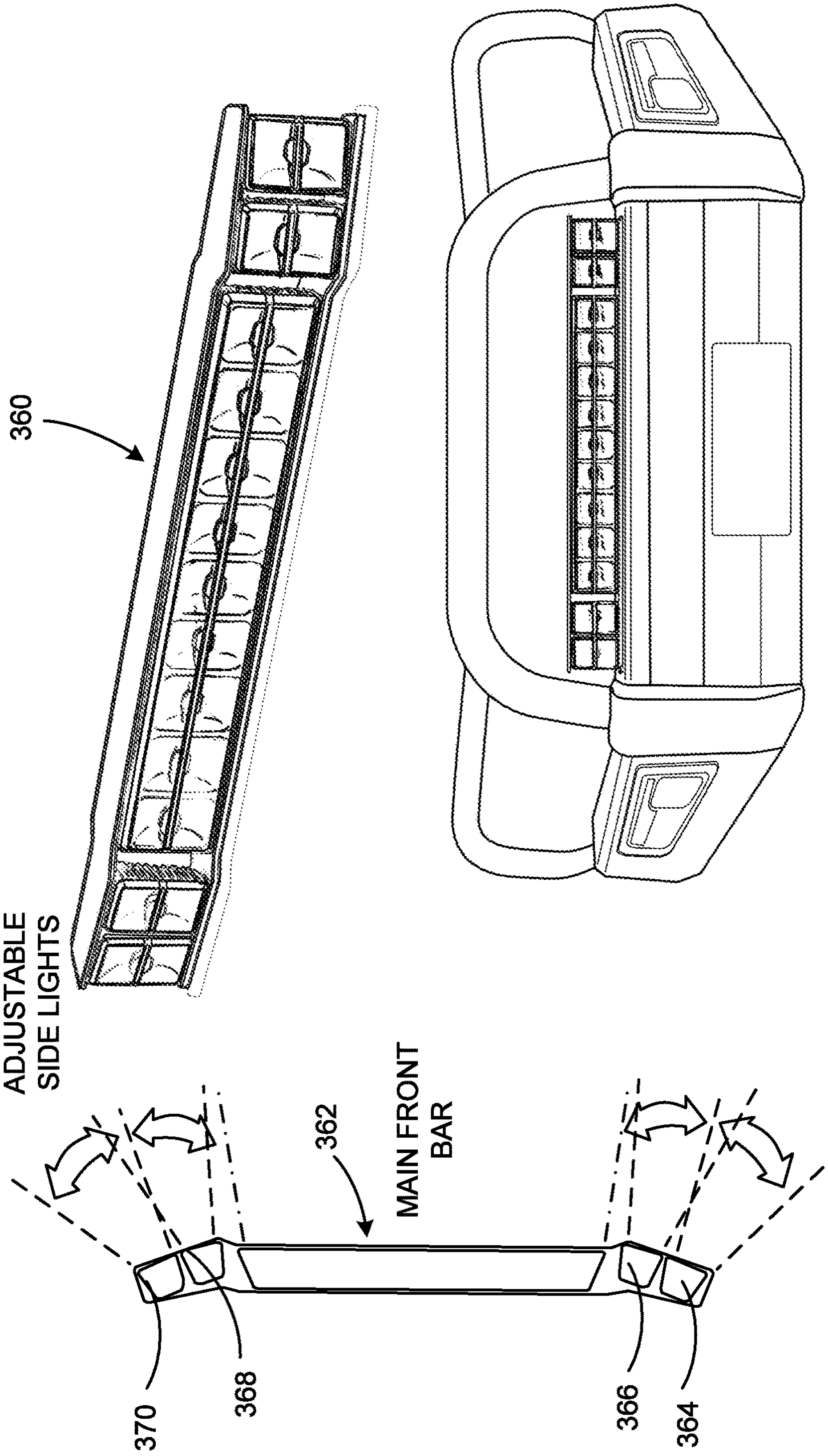

In a further arrangement within FIGS. 15 and 16, in some embodiments the driving light system may include a combination of integrated light bars comprising multiple lighting modules having integrated housings and independent lighting modules mounted to a vehicle by mounting plates. As can be seen in these figures, a hybrid light module array 360 is depicted including a first integrated light bar 362 and four independent lighting modules 364 to 370. The integrated light bar 362 includes multiple lighting modules each resembling the "double stack" arrangement depicted in FIG. 14, however the housings of all lighting units within the light bar 362 are integrated. Independent lighting modules 364 to 370 are identical to the "double stack" arrangement shown in FIG. 14 but are independent lighting modules. Both the light bar 62 and the independent modules 364 to 370 are mounted between mounting plates 372 and 374 for attachment to a vehicle 376. An advantage of such an arrangement is the independent adjustment made possible of the independent lighting modules, which may as depicted in FIGS. 15 and 16, be located to the exterior of the lighting module array.

Figure 17:
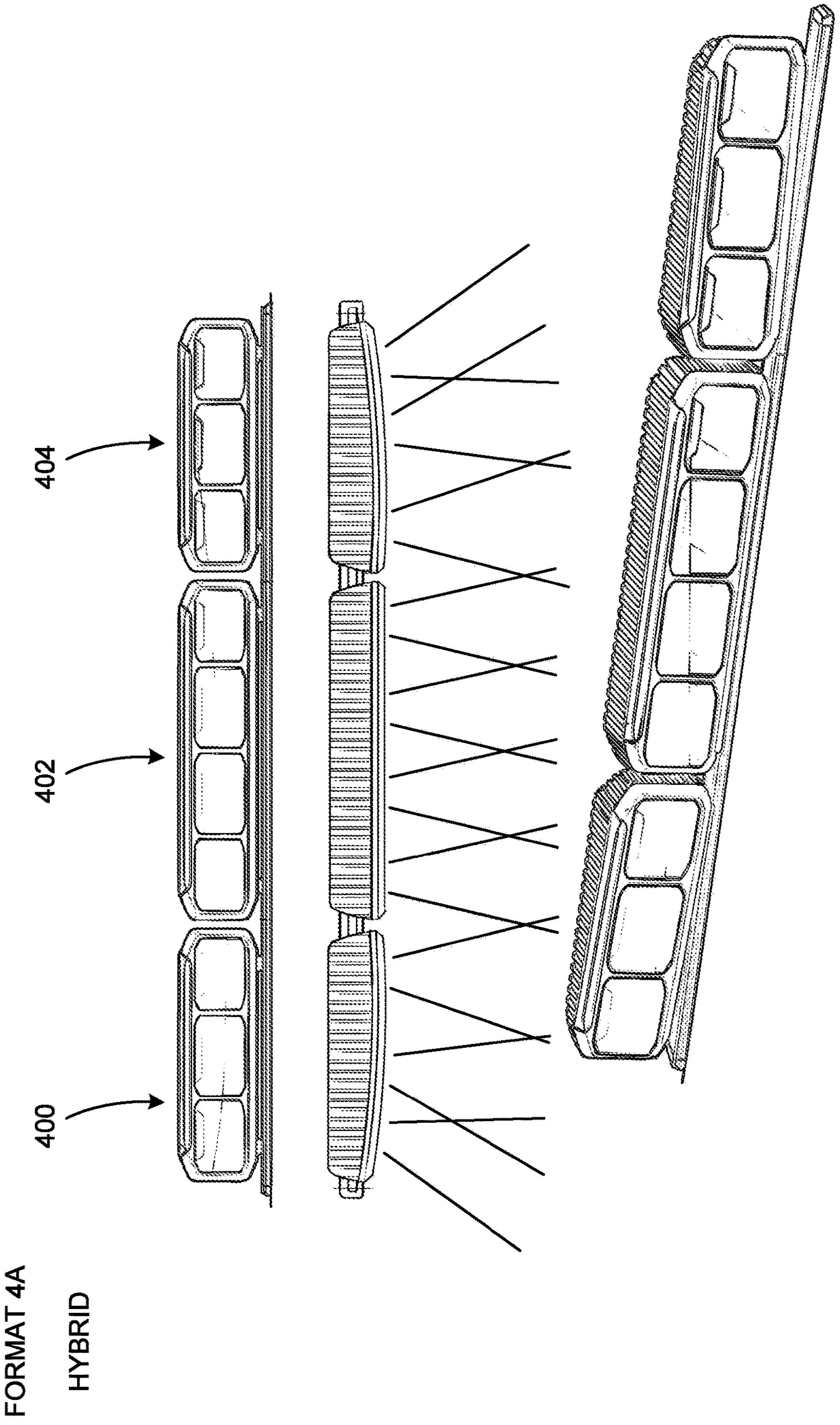
FIGS. 17 and 18 depict a further embodiment of a driving light system according to the present invention including three groups of light modules, each group having light housings and sensor housings for each lighting module in the group integrated, and each integrated group of lighting modules being mounted to a mounting bar.

FIG. 17 depicts yet another embodiment of a driving light system for a vehicle, wherein the array of lighting modules forming part of the driving light system comprises multiple integrated light bars 400 to 402, each including multiple lighting modules sharing an integrated housing within the one light bar.

Figure 18:
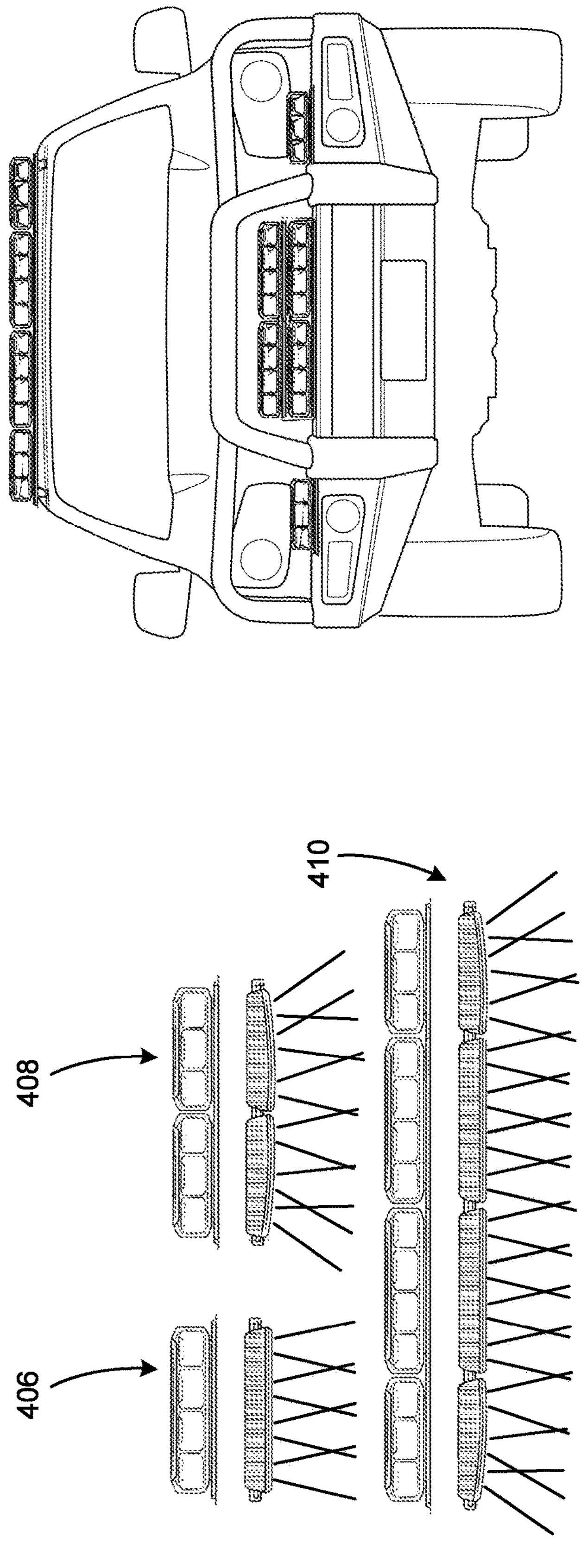

As depicted in FIG. 18, light bars such as these may be used in different configurations of one, two, four or other number of light bars, such as the referenced 406 to 410, in order to make up the desired array of lighting modules for use as part of a driving light system for a vehicle.

In the light modules depicted notably in FIGS. 3 and 12, the feedback electronics mounted between the light emitter unit and directional light sensor unit of a lighting module act as a feedback controller for automatically controlling the brightness of the emitted beam from that lighting module as a function of light detected by the directional light sensor from that same lighting module.

Figure 19:
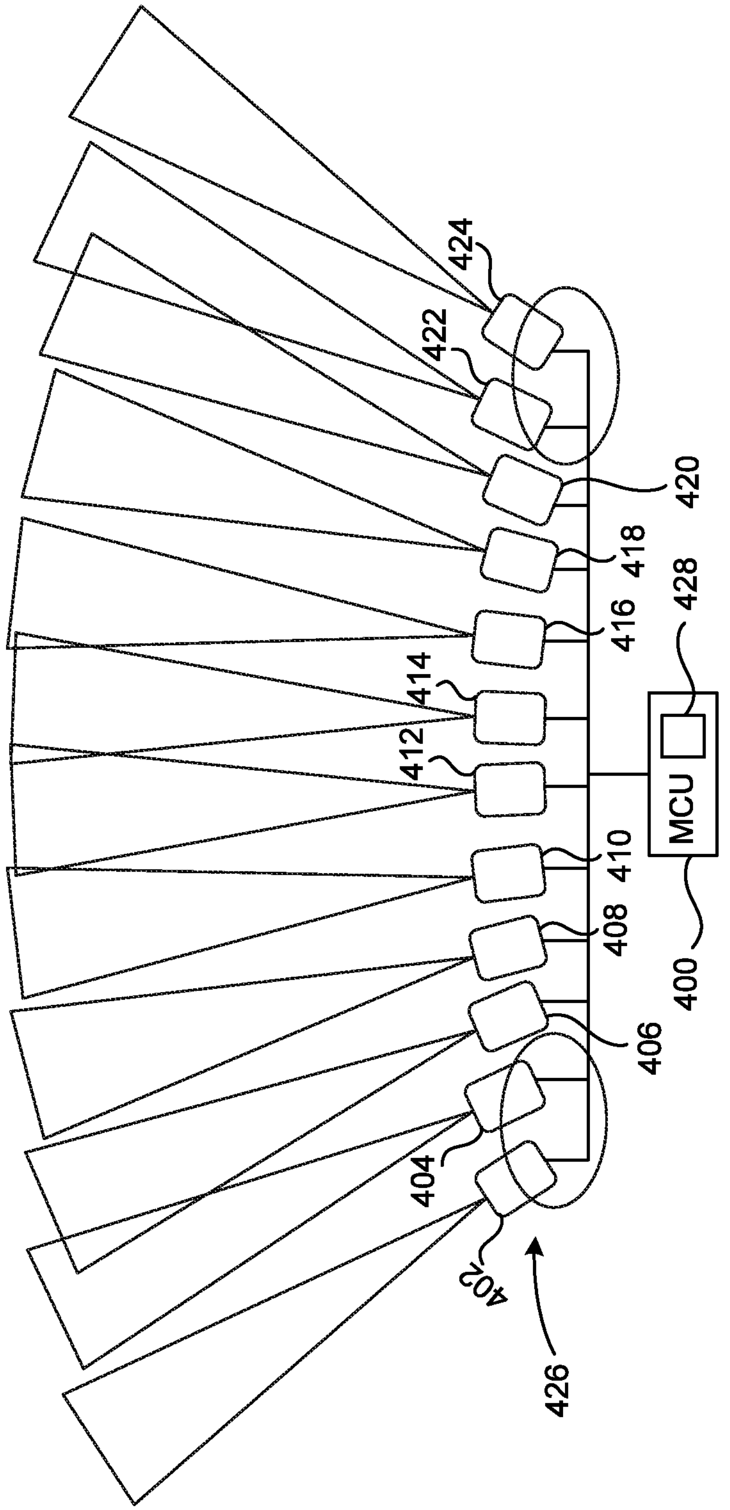
FIG. 19 schematically depicts an embodiment of a driving light system according to the present invention in which a common controller for automatically controlling the brightness of each emitted light beam controls operation of a plurality of lighting modules in the array.

However, in other embodiments the feedback electronics of each lighting module are operably connected to a central feedback controller, as depicted in FIG. 19. In this figure, a feedback controller 400 is operably connected to feedback electronics associated with each lighting module 402 to 424 forming part of an array 426 of lighting modules. Such an arrangement enables the feedback controller 400 to be configured to automatically control the brightness of the emitted light beam from any of the lighting modules 402 to 424 as a function of light detected by the directional light sensor from one or more of the same or other lighting modules in the array 426 of lighting modules. For example, in addition to or as an alternative to the brightness of an emitted light beam from a particular module being controlled as a function of light detected by the directional light sensor from that module, light detected by directional light sensors from adjacent modules may be taken into account.

In some embodiments, the feedback controller 400 may be configured to deal with the emitted light beam from a particular lighting module by a fixed amount if the sensor reading from that same lighting module is greater than a predetermined threshold than the sensor reading from one or more of the same or other lighting modules 402 to 424. The predetermined threshold in this and other embodiments may be a dynamic threshold or alternatively may be an adaptive threshold In order to better identify the particular light emitter unit that is to be controlled so as to adjust the brightness of the light beam emitted from the light emitter unit, the driving light system may further include a modulator 428 for modulating the light beam emitted by each light emitter unit in a different manner. In one illustrative embodiment, the modulator may be implemented as a software module in the feedback controller 400.

In one or more embodiments, one or more of the light sensor units may be adapted to determine the particular light emitter unit from which the modulated light beam was emitted.

For example, the modulator may be configured to apply one of the following modulations to the light beam emitted by each light emitter unit:

- applying a different Pulse Width Modulation (PWM) frequency for each light emitter unit;
- applying a different PWM phase for each light emitter unit;
- periodically insert a burst of unique frequency PWM into the light beam emitted by each light emitter unit;
- periodically insert a unique code into each light emitter unit; and
- periodically insert a uniquely timed burst of an identified pattern into each light emitter unit.

Figure 20:
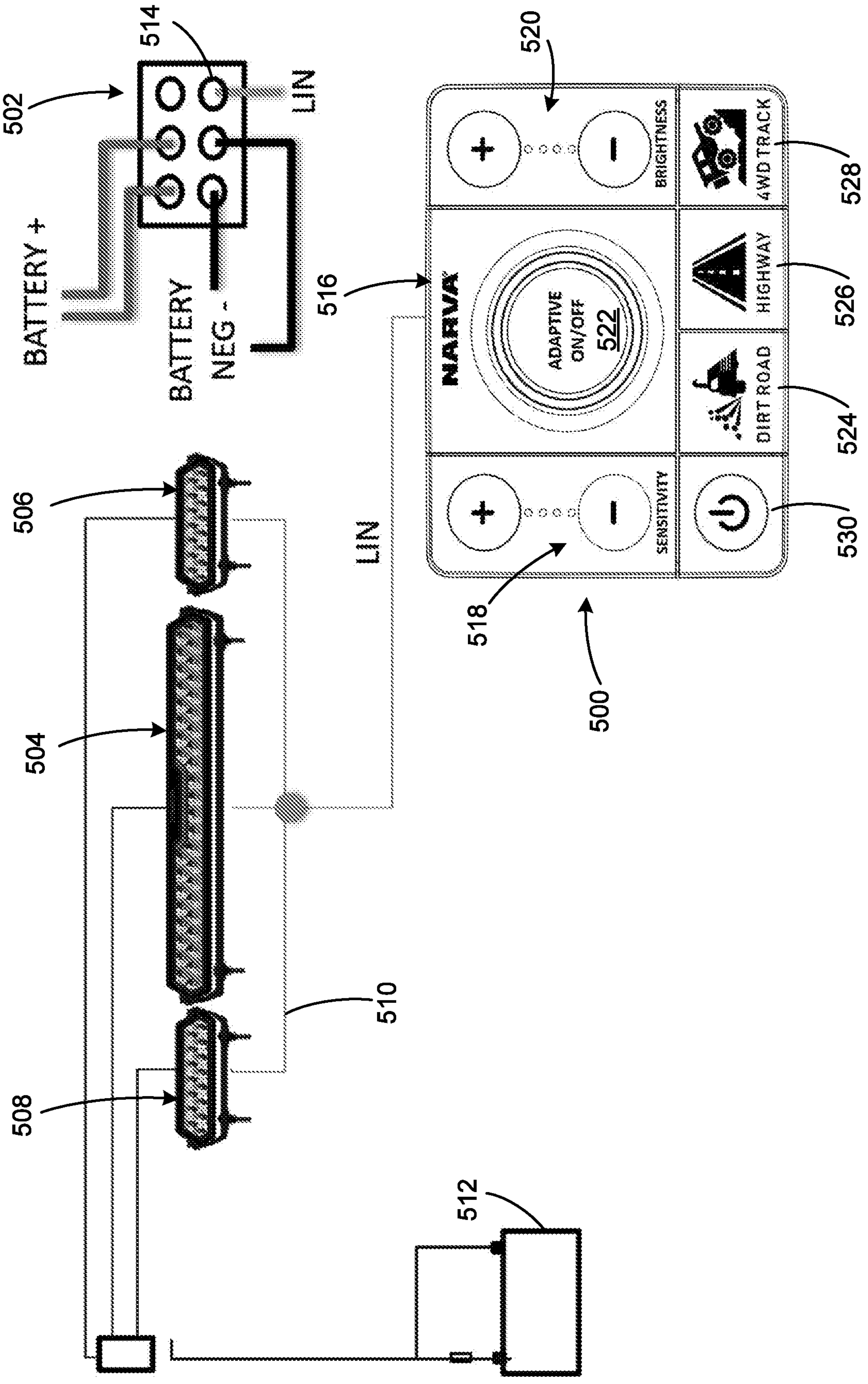
FIG. 20 is a schematic diagram showing a variant of the driving light system shown in FIG. 19 in which a central controller (master) and a plurality of distributed controllers (slaves), each lighting controller including a separate one of the plurality of distributed controllers, interact to control operation of the driving light system shown in FIG. 19.

FIG. 20 is a schematic diagram showing a variant of the driving light system shown in FIG. 19 in which a central controller 500 (master) and a plurality of distributed controllers 502 (slaves) interact to control operation of the driving light system. Each lighting module includes a separate one of the plurality of distributed controllers 502. In this embodiment, groups of one or more lighting modules are arranged so that their housings are integrated into a main integrated lighting module array 504 and two auxiliary integrated light module arrays 506 and 508. The lighting module arrays 504 to 508 are structurally identical to the integrated lighting module arrays 150 to 154 shown in FIG. 9.

The central controller 500 is operably interconnected to the plurality of distributed controllers 502 via broadcast serial network 510. In one or more embodiments, the broadcast serial network 510 operates via LIN bus serial communications protocol.

A vehicle battery 512 provides power to each distributed controller 502 via terminals BATTERY+ and BATTERY NEG−. Each distributed controller 502 further includes a serial communication port 514 for connection to the broadcast serial network 510.

A manual input panel 516 is provided for the central controller 500. The manual input panel 516 includes inputs 518 in response to which central controller 500 is configured to adjust the predetermined "sensitivity" threshold at which an emitted light beam is either dimmed or brightened; inputs 520 in response to which the central controller 500 is configured to vary from one or more pre-set brightness levels of one or more of the lighting modules; and input 522 in response to which the central controller 500 is configured to engage or disengage automatic light beam brightness control.

The manual input panel 516 further includes inputs 524 to 528 to enable user manual selection of pre-set brightness levels for use in different driving conditions, as well as input 530 to enable user activation of the central controller 500.

FIG. 21 is a table 540 depicting manually selectable operational states of the driving light system shown in FIG. 20.

While the invention has been described in conjunction with a limited number of embodiments, it will be appreciated by those skilled in the art that many alternative, modifications and variations in light of the foregoing description are possible. Accordingly, the present invention is intended to embrace all such alternative, modifications and variations as may fall within the spirit and scope of the invention as disclosed.

The present application may be used as a basis or priority in respect of one or more future applications and the claims of any such future application may be directed to any one feature or combination of features that are described in the present application. Any such future application may include one or more of the following claims, which are given by way of example and are non-limiting in regard to what may be claimed in any future application.

Where the terms "comprise", "comprises", "comprised" or "comprising" are used in this specification (including the claims) they are to be interpreted as specifying the presence of the stated features, integers, steps or components, but not precluding the presence of one or more other features, integers, steps or components, or group thereof.

The claims defining the invention are as follows:

1. A driving light system for a vehicle, including:

an array of lighting modules for illuminating a lighting zone in front of a vehicle, each module including:

a light emitter unit for emitting a light beam along a light path to illuminate a segment of the lighting zone; and a directional light sensor unit adapted to detect reflected light from reflective surfaces in the path of the light beam, and at least one controller configured to automatically control the brightness of each emitted light beam as a function of light detected by one or more of the directional light sensor units while the light emitter unit remains on, and wherein the at least one controller is further configured to dim the emitted light beam by a fixed amount if a sensor reading of the one or more sensor units increased at greater than a predetermined rate.

2. The driving light system according to claim 1, wherein the lighting modules are arranged to illuminate segments extending laterally across the lighting zone.

3. The driving light system according to claim 1, wherein each light emitter unit includes:

one or more light sources housed in an emitter housing.

4. The driving light system according to claim 3, wherein each light emitter unit further includes either one or both of:

an optical element to focus light from the one or more light sources through a lens along the light path, and a heat sink to cause heat to flow away from the light emitter unit.

5. The driving light system according to claim 1, wherein each directional light sensor unit includes:

a light sensor housed in a sensor housing.

6. The driving light system according to claim 5, wherein each directional light sensor unit further includes:

a collimator for focusing the reflected light on the light sensor.

7. The driving light system according to claim 1, wherein the light sensor unit is mounted in each lighting module below the light emitter unit, when in use, to avoid heating of the at least one controller and light sensor unit by the light emitter unit.

8. The driving light system according to claim 3, wherein each directional light sensor unit includes a collimator for focusing the reflected light on the light sensor, and wherein the emitter housing and sensor housing of each lighting module are integrated, or the emitter housing and sensor housing of a plurality of lighting modules in the array are integrated.

9. The driving light system according to claim 8, further including:

one or more mounting brackets for mounting the lighting modules to the vehicle.

10. The driving light system according to claim 1, wherein the at least one controller is configured to perform any one or more of:

(i) automatically controlling the brightness of the emitted light beam from each lighting module as a function of light detected by the directional light sensor unit from said each lighting module;

(ii) dimming the emitted light beam by a fixed amount if the sensor reading is greater than a predetermined threshold;

(iii)

(iv) brightening the emitted light beam by a fixed amount if the sensor reading is less than a predetermined threshold;

(iv) automatically controlling the brightness of the emitted light beam from each lighting module as a function of light detected by the directional light sensor unit from one or more other lighting modules in the array of lighting modules; and (v) dimming the emitted light beam from said each lighting module by a fixed amount if the sensor reading from said each lighting module is greater by a predetermined threshold than the sensor reading from the one or more other lighting modules.

11. The driving light system according to claim 1, further including:

a modulator for modulating the light beam emitted by each light emitter unit in a different manner, wherein one or more of the light sensor units are adapted to determine the particular light emitter unit from which the light beam was emitted.

12. The driving light system according to claim 11, wherein the modulator is configured to apply one of the following modulations to the light beam emitted by each light emitter unit:

applying a different Pulse Width Modulation (PWM) frequency for each light emitter unit;

applying a different PWM phase for each light emitter unit;

periodically inserting a burst of unique frequency PWM into the light beam emitted by each light emitter unit;

periodically inserting a unique code into each light emitter unit; and periodically inserting a uniquely timed burst of an identified pattern into each light emitter unit.

13. The driving light system according to claim 1, wherein each lighting module includes a separate controller.

14. The driving light system according to claim 1, wherein the at least one controller includes a central controller to automatically control operations of each of the lighting modules.

15. The driving light system according to claim 14, wherein the at least one controller further includes a plurality of distributed controllers, each lighting module including a separate one of the plurality of distributed controllers, wherein the central controller and the plurality of distributed controllers respectively function as master and slaves.

16. The driving light system according to claim 15, further including a broadcast serial network facilitating communication between the central controller and the plurality of distributed controllers.

17. The driving light system according to claim 16, wherein the central controller and the plurality of distributed controllers communicate via a LIN bus serial communications protocol.

18. The driving light system according claim 1, wherein the at least one controller is configured to adjust a predetermined threshold in response to a manual user input.

19. The driving light system according claim 1, wherein the at least one controller is further configured to adjust the brightness of the emitted light beam from one or more of the lighting modules from one or more preset brightness levels in response to a manual user input.

20. The driving light system according to claim 1, wherein the at least one controller is further configured to engage or disengage automatic light beam brightness control in response to a manual user input.

* * * * *